Feb. 22, 1966 H. W. McCLARNEY ETAL 3,236,924
METHOD AND APPARATUS FOR LAYING MASONRY UNITS
Filed March 19, 1962 7 Sheets-Sheet 3
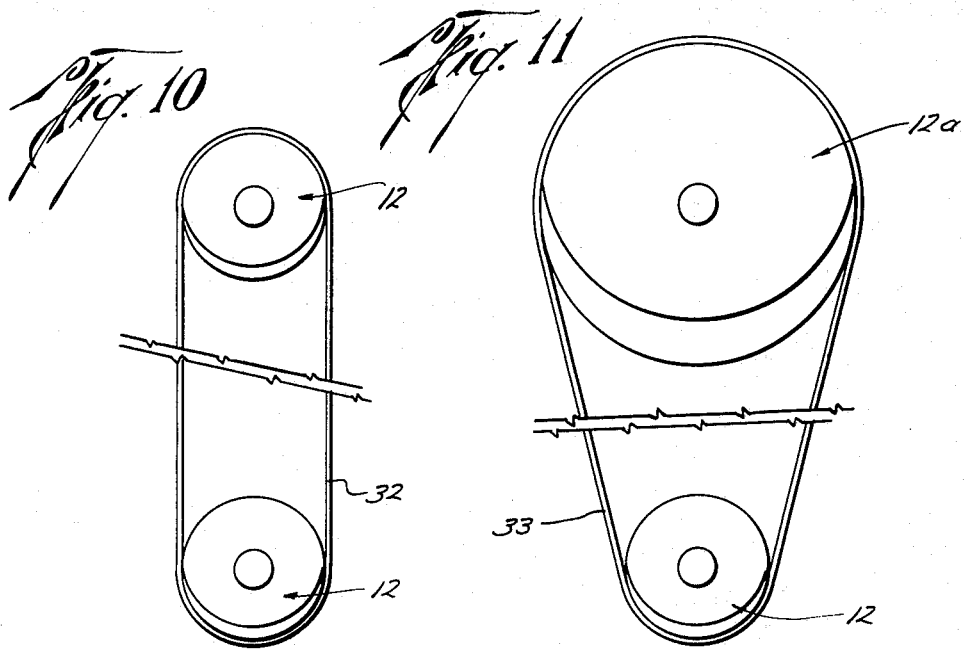
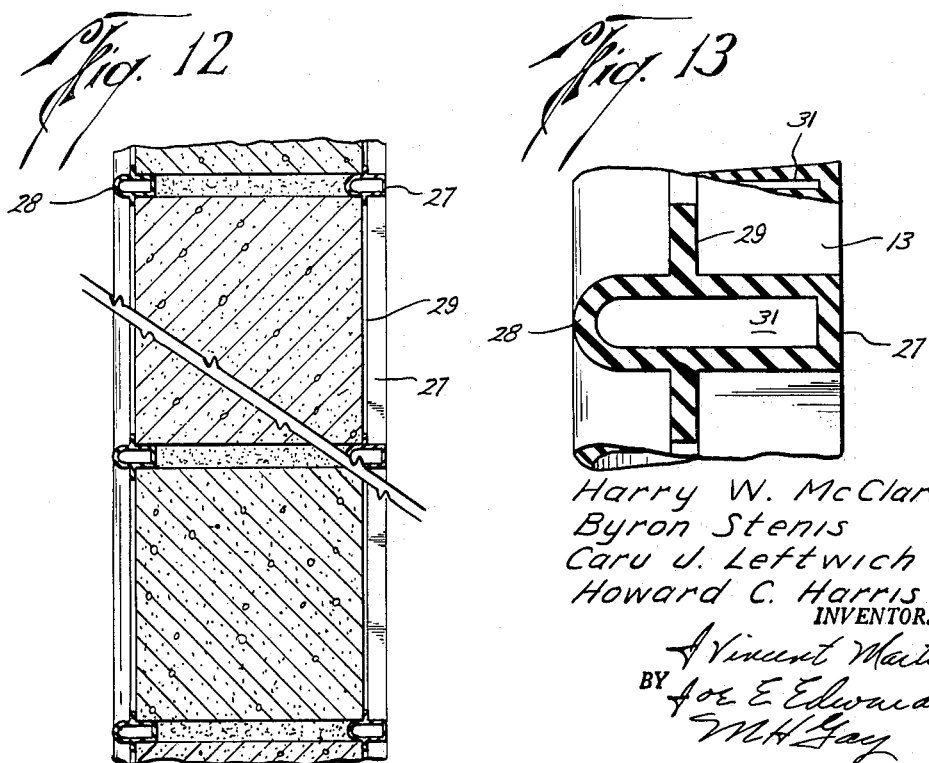
Harry W. McClarney
Byron Stenis
Caru J. Leftwich
Howard C. Harris
INVENTORS
BY
ATTORNEYS

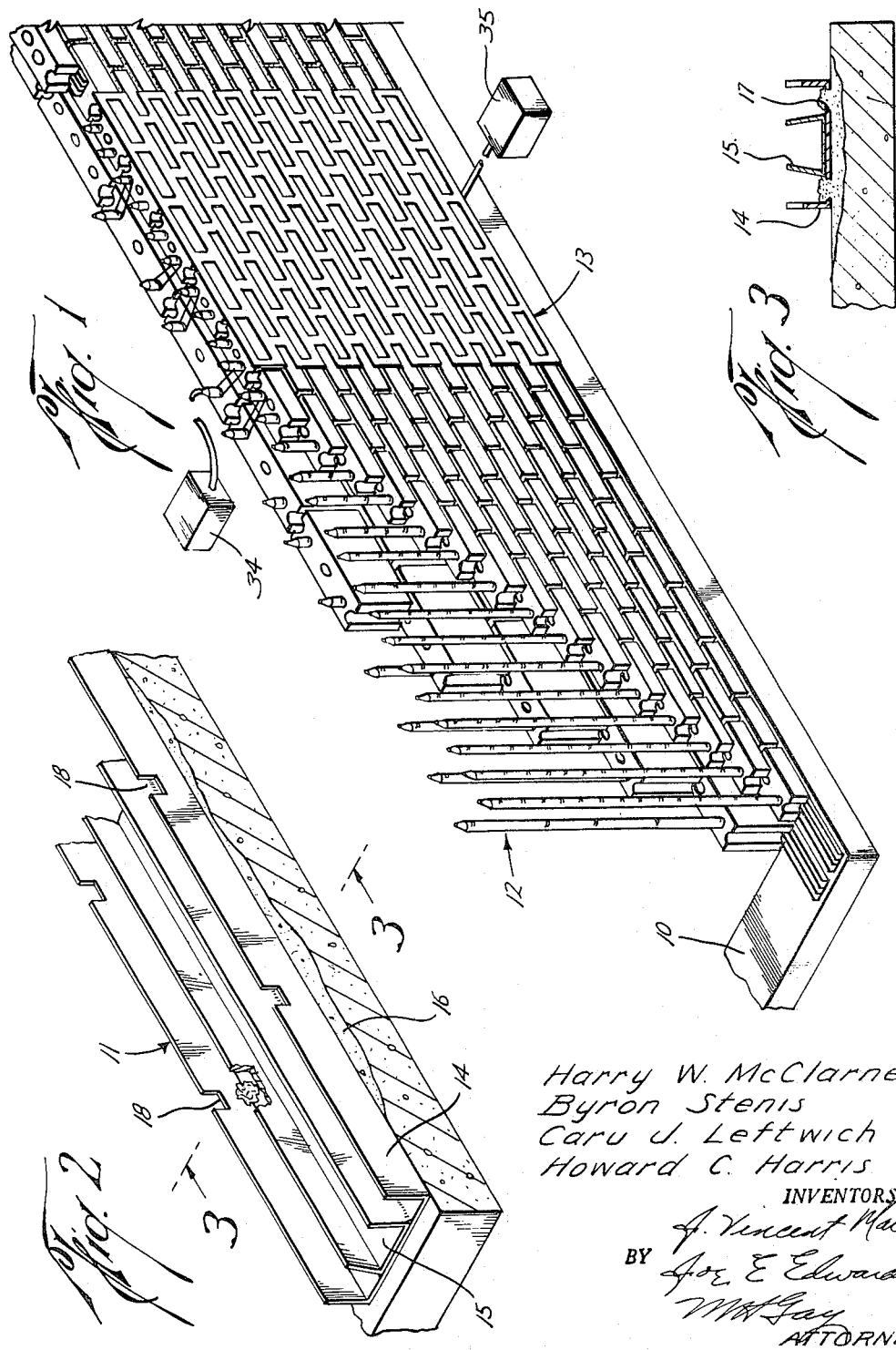

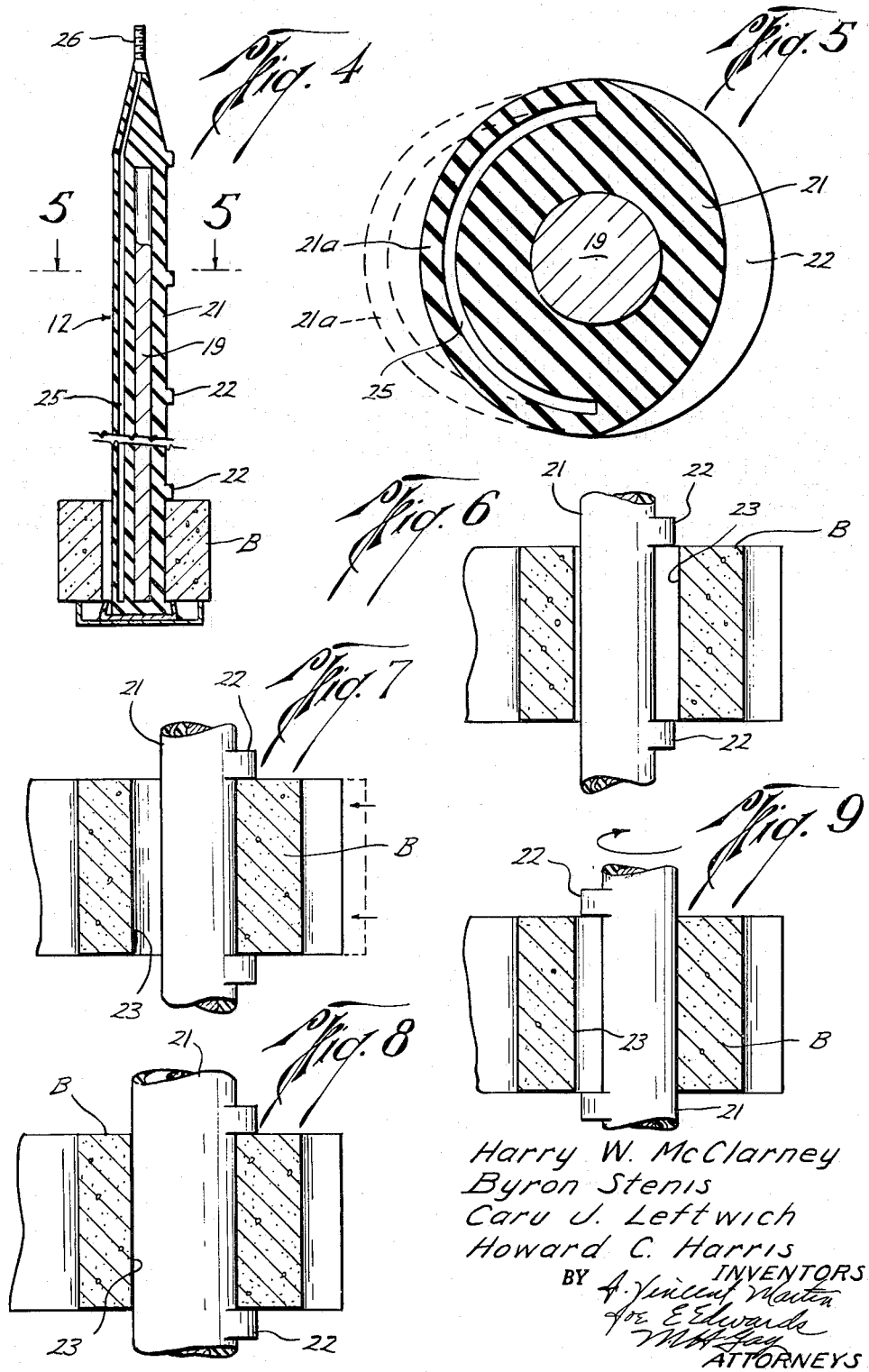

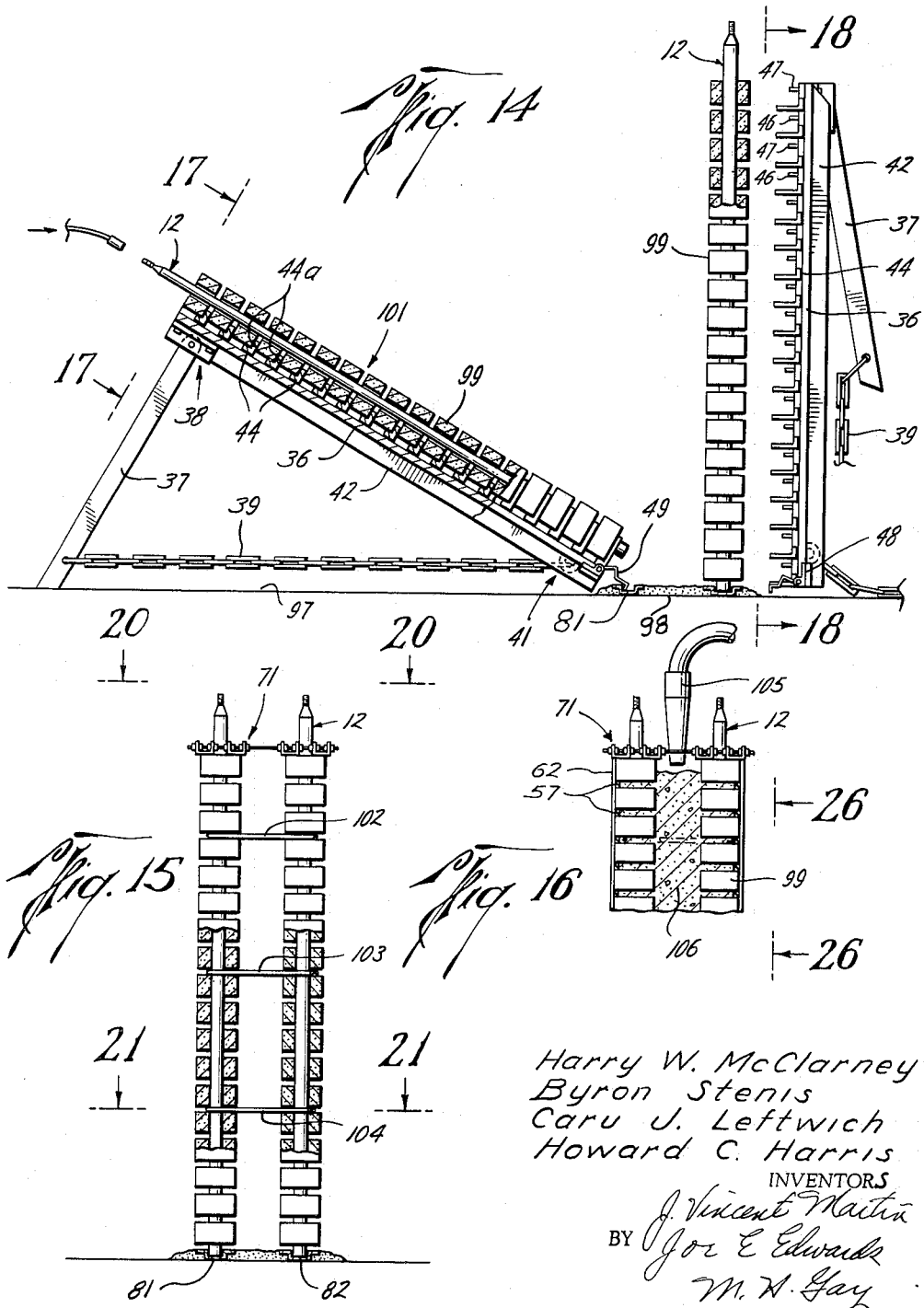

Feb. 22, 1966    H. W. McCLARNEY ETAL    3,236,924
METHOD AND APPARATUS FOR LAYING MASONRY UNITS
Filed March 19, 1962    7 Sheets-Sheet 5
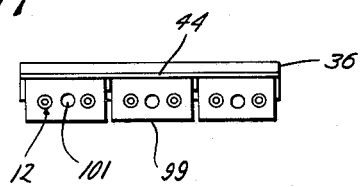
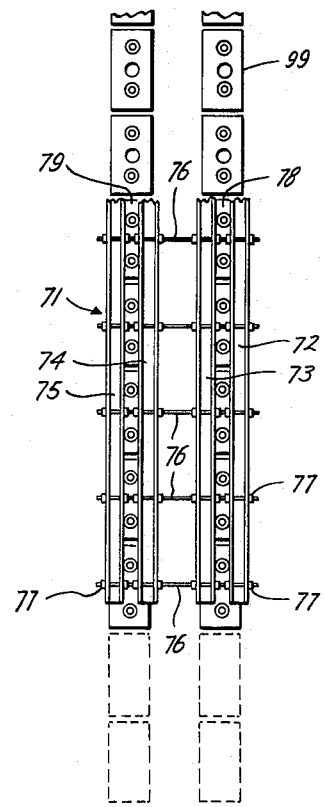
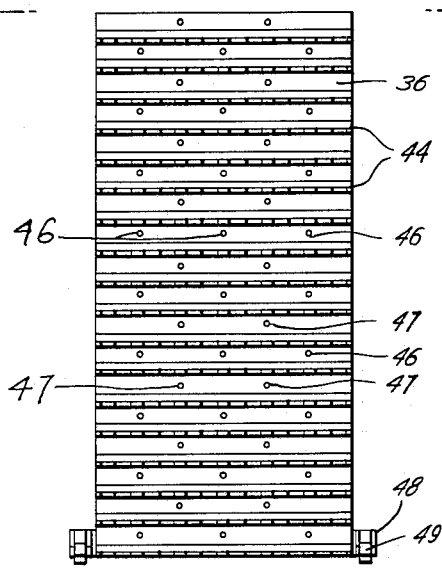
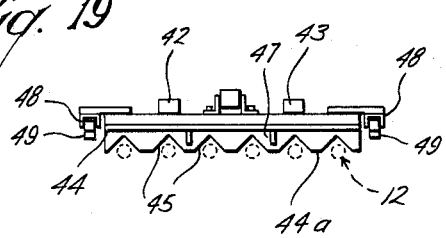
Harry W. McClarney
Byron Stenis
Caru J. Leftwich
Howard C. Harris
INVENTORS
BY J. Vincent Martin
Jos. E. Edwards
M. H. Gay
ATTORNEYS

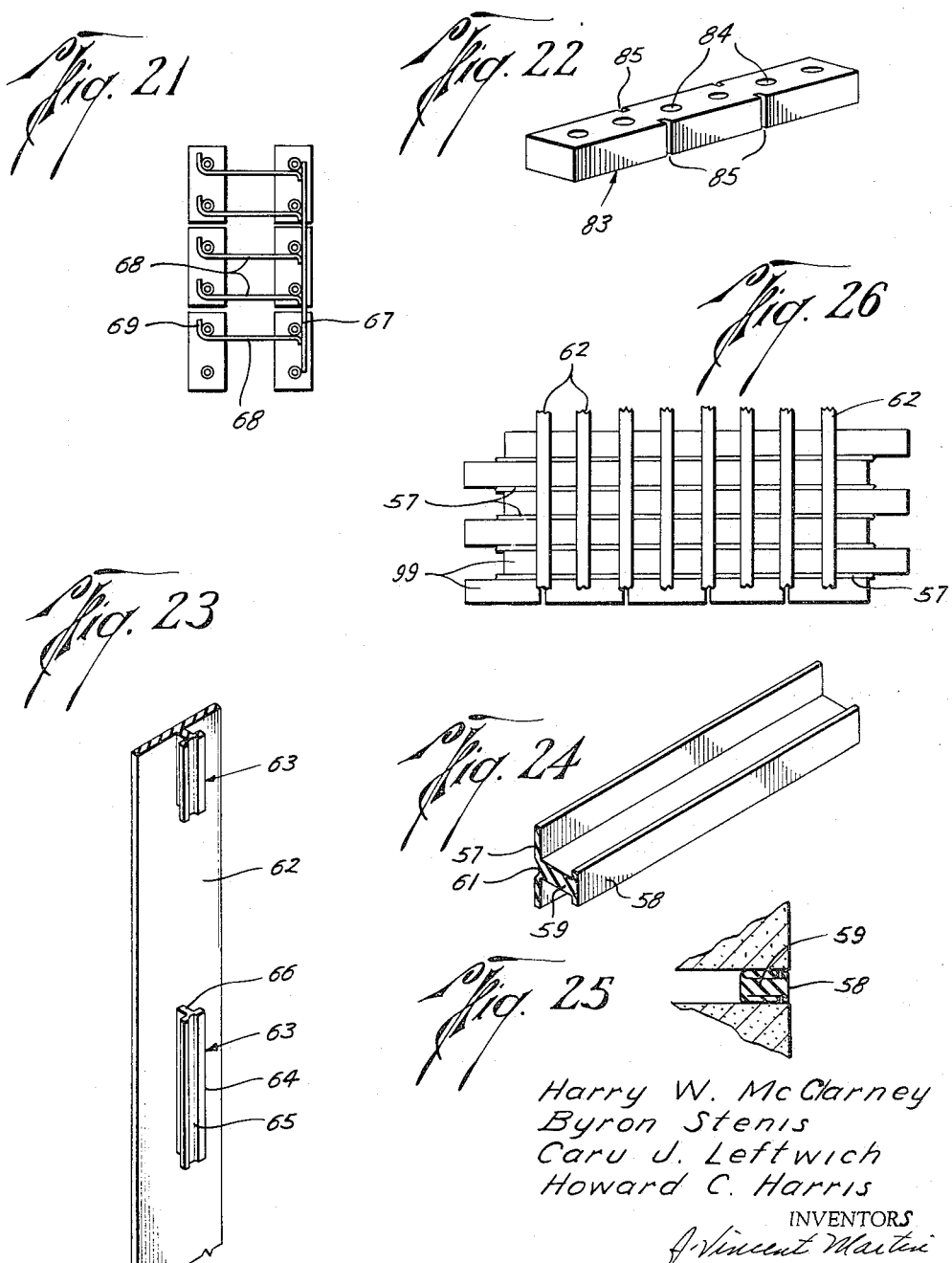

Feb. 22, 1966  H. W. McCLARNEY ETAL  3,236,924
METHOD AND APPARATUS FOR LAYING MASONRY UNITS
Filed March 19, 1962  7 Sheets-Sheet 7
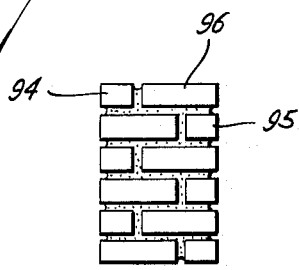
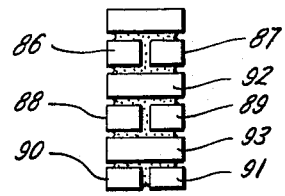
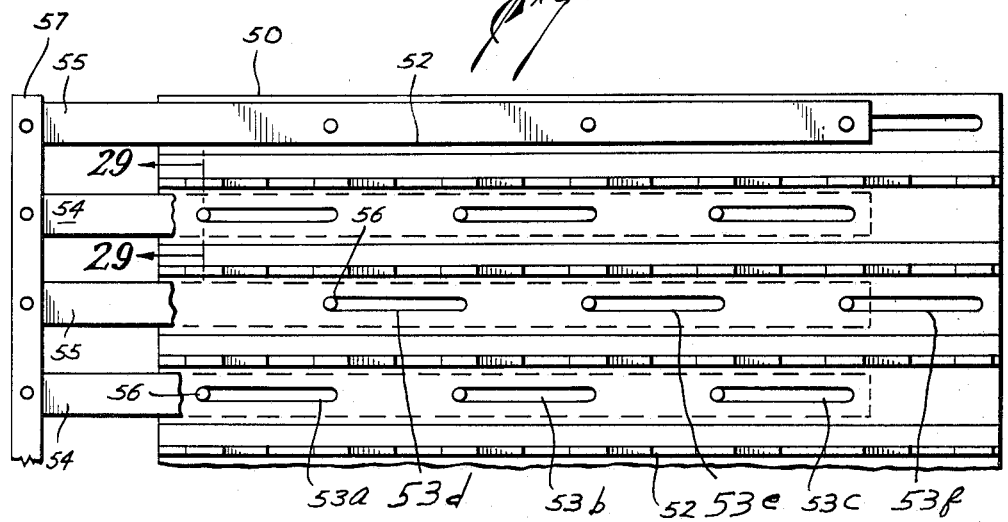
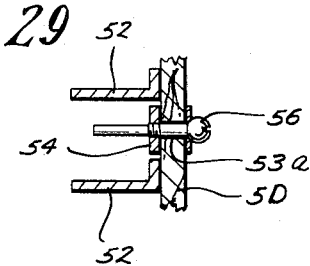
Harry W. McClarney
Byron Stenis
Caru J. Leftwich
Howard C. Harris
INVENTORS
BY
ATTORNEYS United States Patent Office 3,236,924
Patented Feb. 22, 1966

3,236,924
METHOD AND APPARATUS FOR LAYING MASONRY UNITS
Harry W. McClarney, Byron Stenis, Caru J. Leftwich, and Howard C. Harris, all of P. O. Box 9346, Houston, Tex.
Filed Mar. 19, 1962, Ser. No. 182,994
18 Claims. (Cl. 264—35)

This application is a continuation-in-part of our co-pending application Serial No. 48,048, filed August 8, 1960, and now abandoned.

This invention relates to methods and apparatus for constructing masonry walls.

As is well known, masonry walls have always been constructed by masons laying each masonry unit such as clay brick, tile, building blocks, etc., separately. The appearance and strength of the wall has always depended upon the skill of the mason, as all operations have been carried out by hand.

It is an object of this invention to provide methods and apparatus for laying masonry units in which the normally skillful operations of aligning, mortaring, etc. are carried out by mechanical means.

Another object is to provide a method and apparatus of laying masonry units which may be carried out by relatively unskilled workmen.

Another object is to provide a method and apparatus for laying masonry units which may be carried out by unskilled workmen at substantial savings when compared with the cost of laying masonry units by hand.

Another object is to provide apparatus and methods of laying masonry units in which several operations necessary in laying units by hand are eliminated to reduce labor costs.

Another object is to provide methods and apparatus of laying masonry units in which it is not necessary to build corners and/or angles to start a particular wall or section of a building.

Another object is to provide a method and apparatus for laying masonry units in which pointing and tooling of mortar joints is eliminated.

Another object is to provide a method and apparatus for laying masonry units in which it is not necessary to clean the finished wall.

Another object is to eliminate the necessity of waterproofing masonry walls by providing a method and apparatus that permit the erection of a solid wall thus preventing water intrusion.

Another object is to provide a method and apparatus for laying masonry units in which the finished wall will present a uniform appearance with straight vertical and horizontal lines, even mortar joints and plumb and true faces.

Another object is to provide apparatus and method for laying masonry units in which imperfections caused through error and varying degrees of skill of mechanics are eliminated.

Another object is to provide method and apparatus for laying masonry units in which the resultant wall is stronger than walls constructed by hand.

Another object is to provide a method and apparatus for speeding up the laying of masonry units as compared with hand masonry work.

Another object is to provide a method and apparatus for laying masonry units which does not require an extensive apprenticeship to train the operator.

Another object is to provide a masking grid for use in laying masonry units which may be attached directly to the several units making up the masonry wall and confine mortar being poured into spaces between adjacent units.

Another object is to provide a base plate for use in erecting masonry walls which provides a level base on which the wall may be constructed and aligns the masonry units in a straight line.

Another object is to provide an aligning device for use in constructing masonry walls which extends through holes in the several masonry units and supports the units in spaced relationship preparatory to receiving mortar as well as aligns the several masonry units in proper relationship.

Another object is to provide means for supporting and aligning the several masonry units of a masonry wall in which the support is provided internally of the masonry wall and in which the supporting means may be removed for re-use after the wall has been erected.

Other objects, features and advantages of this invention will be apparent from the drawings, the specification and the claims.

In the drawings, wherein an illustrative embodiment of this invention is shown, and wherein like reference numerals indicate like parts:

FIGURE 1 is a schematic illustration of a brick and concrete building block wall being constructed in accordance with the method of this invention;

FIGURE 2 is a schematic illustration of a fragment of a form of the base plate for use in practicing this invention;

FIGURE 3 is a view along the lines 3—3 of FIGURE 2;

FIGURE 4 is a view in cross-section through a preferred form of aligning rod shown supported on a base plate and extending through the first course of masonry units;

FIGURE 5 is a view in cross-section along the lines 5—5 of FIGURE 4 and showing in dashed lines the configuration of the aligning rod when laterally expanded;

FIGURE 6 is a view in elevation of a fragment of an aligning rod and showing in cross-section a fragment of a masonry unit being passed downwardly over the aligning rod;

FIGURE 7 is a view similar to FIGURE 6 showing the masonary unit to have reached its desired vertical position and to have been moved laterally to a position at rest upon flanges on the aligning rod;

FIGURE 8 is a view similar to FIGURE 7 showing the aligning rod to have been laterally expanded;

FIGURE 9 is a view similar to FIGURE 7 showing the relationship of the aligning rod and masonry unit after the aligning rod has been laterally contracted and then rotated 180° to permit it to be withdrawn from the masonry wall;

FIGURES 10 and 11 are views illustrating ties between adjacent aligning rods;

FIGURE 12 is a view in section through a wall constructed in accordance with this invention showing masking grids in place on opposite sides of the wall and confining cement slurry to the spaces between adjacent masonry units within the wall;

FIGURE 13 is a view on an enlarged scale of a fragment of the grid shown in FIGURE 12;

FIGURE 14 is a view partially in elevation and partially in section illustrating the building of a wall using a board as a means of aligning masonry units before aligning rods are inserted therein, one section of masonry units being shown in position in the wall with the supporting board withdrawn therefrom, and another supporting board with a section of wall thereon with the aligning rods inserted but not inflated;

FIGURE 15 is a view partially in elevation and partially in cross-section of the wall section of FIGURE 14 with the inner and outer sections of the wall in erected position and supported upon the aligning rods;

FIGURE 16 is a fragmentary view similar to FIGURE 15 showing the wall section with the masking grid applied to opposite faces of the two masonry unit sections and mortar being introduced into the wall to fill the spaces between the two sections of the wall and masonry units;

FIGURE 17 is a partial top view of the supporting board taken along the lines 17—17 of FIGURE 14;

FIGURE 18 is a front view of the supporting board taken along the lines 18—18 of FIGURE 14;

FIGURE 19 is a top plan view of the board taken along the lines 19—19 of FIGURE 18;

FIGURE 20 is a top plan view of a portion of a wall in the process of erection taken along the lines 20—20 of FIGURE 15;

FIGURE 21 is a view along the lines 21—21 of FIGURE 15;

FIGURE 22 is an isometric view of a brick which may be used in practicing the method of this invention;

FIGURE 23 is an isometric view of a form of head joint for masking a wall;

FIGURE 24 is an isometric view of a form of bed joint grid member for use in masking a wall;

FIGURE 25 is a fragmentary sectional view through a bed joint of the wall showing the bed joint grid member in position;

FIGURE 26 is a fragmentary view along the lines 26—26 of FIGURE 16 showing the bed and head joint grid members in position;

FIGURE 27 is a view in elevation of a wall constructed in accordance with this invention at a jamb;

FIGURE 28 is a fragmentary view in vertical elevation with parts broken away illustrating a preferred form of aligning board for use in practicing this invention;

FIGURE 29 is a fragmentary view taken along the lines 29—29 of FIGURE 28; and

FIGURE 30 is a view in elevation of a jamb wherein the inner and outer sections of a wall are spaced apart in the manner illustrated in FIGURE 16.

In erecting a masonry wall to form a part of a building, a free-standing wall, etc., a suitable footing is provided, such as sill 10. As this member 10 is commonly of poured concrete, it is not exactly level. Therefore, a base plate is provided to give a level footing to the wall. Preferably, this base plate also serves as a means for vertically aligning the wall. A base plate such as shown at 11, and more fully described hereinafter, may be used.

In carrying out the method of this invention, laterally expandable aligning rods, such as indicated generally at 12, are utilized to support the masonry unit and to align them during erection of the wall. These aligning rods have flanges thereon at spaced points for supporting the masonry units vertically.

In one method of this invention rods, such as shown at 12, are supported and aligned on the foundation sill 10 by base plate 11. The rods are initially held in vertical position by a few masonry units being supported on each rod and interlocked with adjacent rods by masonry units. Note that the lower course of masonry units may rest directly upon the base plate 11 to provide stability to the structure at this time. Thereafter, masonry units may be erected on the rods by being passed down over the rods in the manner shown in FIGURE 6 and supported at the desired elevation on the aligning rod flanges. The masonry units may be supported in any of the desired building forms, but the interlocking pattern is preferred for strength.

Preferably, the masonry units are provided with vertical holes therethrough which are of a standard size, spacing and position. Optionally the end faces of each masonry unit may be provided with a semicircular groove to insure a continuous and additional passage for the flow and even distribution of mortar throughout.

After the masonry units of a desired section of wall have been positioned on the aligning rods 12, the rods are laterally expanded to firmly grip the masonry units in the desired position and to align and rigidify the wall. At this time the wall may be checked for plumb and alignment and any corrections made which are indicated.

After the aligning rods are laterally expanded, a suitable masking is applied to the exposed face or faces of the wall to confine mortar to the interior of the wall. Preferably, this masking is a grid of resilient material which is inserted into spaces between adjacent masonry units and held therein by any desired means.

At this time watery mortar slurry is poured evenly from the top of the wall through open masonry cores and wall cavities and flows down through the wall and fills all spaces within and between adjacent masonry units.

Preferably, the wall is vibrated by small hand vibrators to insure even flow of the slurry throughout the wall and elimination of substantially all voids therein.

After the mortar has set up sufficiently to support the masonry units, the masking is removed from the face of the masonry units and the aligning rods are collapsed and lifted out of the wall. At this time a new section of wall may be laid on the previously erected wall, if desired. It has been found that approximately 4-foot vertical sections may be handled with ease in practicing the method of this invention, and it is preferred to erect the wall in 4-foot high sections and at any practical and convenient length.

As an alternative and faster method of constructing a wall, an aligning board is utilized to align and properly position a large number of masonry units. With the masonry units so aligned and supported, aligning rods are inserted through the proper holes in the masonry units and inflated to lock the masonry units in the position determined by the supporting and aligning board. The assembly is then positioned vertically as a part of a wall with the bottom ends of the aligning rods in the aligning channels on the foundation. Each new section of the wall is locked to a previously erected section by inserting an aligning rod through the interlocking masonry units of two sections as they are brought together. After the wall sections are supported on the aligning rods the board is moved horizontally to disengage the masonry units and clear the wall for further operations. It will be appreciated that this method of wall erection is more rapid than the method previously explained, as the masonry units can be positioned on a generally horizontally extending board in the proper relationship and the rods run through the masonry units after they are all in position much faster than the masonry units can be individually moved over the rods. In fact, it is contemplated that a pair of skilled workmen will be able to lay several thousand masonry units during a normal working day.

After the masonry units are in position the wall will have a masking grid applied thereto and slurry poured into the wall as previously explained.

Referring now in detail to the apparatus, reference is particularly made to FIGURE 2 in which a form of base plate is illustrated. The base plate 11 consists of a channel-shaped member 14 having secured therein, as by welding, a second channel-shaped member 15. The two channels are arranged and fixed to have their four flanges extend to a common plate to provide a support for masonry as illustrated in FIGURE 4. The channel 15 has its flanges sized to receive and align the aligning rod 12 as shown in FIGURE 4 to insure that the lower end of the aligning rods 12 are fixed in a single vertical plane. Preferably, the flanges 14 and 15 are fixed together with the center line of channel 15 overlying the center line of channel 14.

As the base plate 11 is to be cemented to sill 10 by cement such as shown at 16, it is preferred to provide holes in the web of channel 14 outboard of channel 15, such as shown at 17 in FIGURE 2. Mortar will fill these holes and interlock the base plate with the sill.

To insure that mortar poured into the wall will completely fill the space between the first course of masonry and the sill 10, notches 18 are cut in both flanges of channel member 14 at spaced points therealong to permit the flow of mortar from the interior to the exterior of the channel.

The aligning rod 12 may take any form which is laterally expandable to support masonry units during the erection of the wall. Preferably, the rod should be designed so that it can be removed after the wall is erected for re-use. The laterally expandable feature of the rod permits it to grip the masonry units and hold them in the desired position, as well as align the wall. Preferably, the aligning rod has a plurality of flanges thereon to temporarily support masonry units on the rod before the rods are expanded.

A preferred form of aligning rod is shown in FIGURES 4 and 5. This rod is built around a substantially central core of relatively strong material, preferably of steel, as shown at 19. An annulus of resilient material, preferably natural or synthetic rubber, 21 surrounds the core 19. At spaced points on the rod the annulus of resilient material 21 is provided with flanges 22 for temporarily supporting masonry units during erection of the wall.

It will be noted from FIGURES 4 through 9 that the annulus 21 when in undistorted position, together with flanges 22, can freely pass through the bores 23 in masonry unit B used in erecting the wall. As best seen in FIGURE 5, the aligning rod when viewed in cross-section through a flange 22 is substantially circular. As the flange is on one side only of the aligning rod, this permits the rod and masonry unit to be shifted laterally relative to each other to move the masonry unit onto a flange to permit the aligning rod to support the masonry unit as shown in FIGURE 7. Masonry units are preferably supported in this manner during the erection of an entire wall section.

After the wall section is erected, it is desired to firmly hold the masonry unit in place and to align the several masonry units of the wall, and for this purpose the aligning rod is preferably provided with means for expanding it laterally. This expansion means is preferably provided by a fluid chamber within the aligning rod. Preferably, this chamber 24 extends the entire length of the aligning rod as shown in FIGURE 4 and is arcuate as shown in FIGURE 5. When the chamber 25 is expanded by fluid pressure, the portion 21a of annulus 21 is expanded laterally to the position shown in dotted lines in FIGURE 5. It will be noted that when chamber 25 is expanded, the aligning rod is substantially circular in cross-section when viewed at a point between flanges 22, and will fill the bore 23 within the several masonry units as best shown in FIGURE 8. In expanding laterally, the aligning rods grip the several masonry units B to fix them in the desired position and rigidify the wall in proper alignment. As the bores 23 through masonry unit B will be vertical and the lower course of masonry units is supported on a level platform provided by the base plate 11, the entire wall will be correctly aligned when the aligning rods are laterally expanded. At this time the wall can be checked and any adjustment made to insure that the wall is absolutely true.

The chamber 25 communicates at the upper end of the aligning rod with a fitting 26 for introducing and exhausting fluid under pressure. If desired, fitting 26 may include suitable valve means for trapping fluid within the chamber 25.

The masonry units may be fabricated from any desired material. They should have a plurality of holes therethrough, and semicircular grooves in their end faces which are optional. To provide an entirely plumb and symmetrical wall, these holes should all be parallel with each other and with the side and end faces of the masonry unit. The number of holes and semicircular grooves through the masonry unit may be any number in excess of two, as aligning rods should extend through two holes and an additional hole should be present for permitting percolation of mortar down through the masonry wall. Of course, mortar could be poured down the spaces between adjacent masonry units or into the space between double masonry walls, but it is preferred to have additional holes through each masonry unit to permit ready percolation of mortar throughout the wall.

After the masonry wall is erected and supported on the aligning rods 12, the spaces between adjacent masonry units should be masked on the outer face of the wall to contain the mortar within the wall. Each exposed face of the wall should be masked. Thus, in dual wall construction such as shown in FIGURE 1, the wall might be masked on both sides. Where the masonry wall is used as a veneer for a previously constructed frame building, the exposed face of masonry units should be masked and the wall of the frame building will confine mortar on the concealed side of the masonry wall, or a sheet of material such as plywood may be positioned at the back face of the wall to confine mortar.

Masking might be carried out in any desired manner. Preferably it is carried out by a grid of material which can be forced into spaces between adjacent masonry units and in some way attached to the several masonry units of the wall. In one form of masking, which is best shown in FIGURES 1, 12 and 13, the masking is expandable to provide a friction grip with the several masonry units. The grid 13 is formed in a plurality of interconnected rectangles which are sized to accommodate the size of masonry unit utilized in erecting the wall, and which are arranged for the particular masonry pattern to be employed. The grid 13 may be fabricated from any desired resilient material and when viewed in cross-section as in FIGURE 13 is substantially rectangular in shape with one end of the rectangle being square as at 27 and the other end of the rectangle being rounded as at 28. At an intermediate point a flange 29 extends laterally to provide a stop limiting the distance which the grid can be inserted between adjacent masonry units. It will be noted from FIGURE 12 that the grid is reversible and when the rounded end 28 of the grid is inserted between masonry units the mortar will set up with a concave face. When the square end 27 is inserted between masonry units, the mortar will set up with a square face. This permits a single grid to be used interchangeably for the desired type of finish.

Within the grid there is provided a chamber 31 which is continuous throughout the grid 13. When this chamber is inflated with pressure fluid, the grid is expanded and frictionally engages the masonry units to fix it in place on the face of the wall. Of course, when the fluid pressure is removed from the chamber 31 after the mortar has set up, the grid may be readily removed from the face of the wall.

In FIGURES 10 and 11 there are shown suitable ties 32 and 33. These two ties differ in that they are associated with two aligning rods 12 of different size. In FIGURE 11 one aligning rod 12 is of one size and another aligning rod 12a is of a larger size. In either case, the ties 32 or 33, as the case may be, are inserted over pairs of adjacent aligning rods of two parallel rows of masonry as shown in FIGURE 1. Preferably, these ties are positioned throughout the wall at spaced points to firmly tie the wall together while the mortar is solidifying. Where the wall is applied as a veneer to an existing structure, the ties may be secured to the existing structure in any desired manner as the masonry units are positioned on the aligning rods.

In utilizing the particular embodiment of the invention illustrated in FIGURES 1 to 13, the base plate 11 is first positioned on the sill or footing 10 and cemented in place as illustrated at 16. The aligning plate 11 will be set back from the outside face of the wall a slight distance so that a cement finish will appear between the footing and masonry. The several aligning rods 12 are inserted in the lower course or two of masonry and aligning rods positioned on the base plate with the aligning rod within the channel 15 of the base plate. The wall is built up as shown in FIGURE 1 with the several masonry units supported on the flanges of the aligning rods. Preferably, all of the flanges of all of the aligning rods are oriented in the same direction. This insures the construction of a straight wall. If the aligning rods are not oriented but are positioned in random orientation, the masonry units will assume the alignment of each rod and the outside face of each masonry unit will not necessarily be flush with the plane of the entire wall. For decorative effects this might be desired in some cases. After about four feet of wall height has been erected in this manner, the several aligning rods are inflated, preferably with air from a suitable source indicated at 34. The plumb and alignment of the wall is checked and any necessary adjustments made.

The masking 13 is then applied to the wall and that portion of the grid on the wall side of the flange 29, which is continuous throughout the grid, is inserted into spaces between adjacent masonry units. Thereafter, air pressure is applied to the grid from a source such as 35 to expand the grid into firm engagement with the masonry units. As the masonry unit is held firmly in position by the aligning rods, the pressure required to expand grid 13 will not affect the alignment or placement of the masonry unit.

After the wall has been suitably masked, a thin mortar slurry is poured into the holes and cracks in the top of the wall and permitted to percolate down through the wall to fill all holes and spaces throughout the wall. It might be noted that the mortar will fill the interior of both channels of the base and the space exterior of the base 11 and between the footing 10 and the lower course of masonry units out to the masking member. Preferably, suitable hand vibrators are used along the wall to make certain that all voids are filled. It might be noted that this type of construction is much stronger than conventional hand construction as all voids are filled. The wall is also substantially impervious to moisture due to the elimination of voids.

After the mortar has set up, the masking is deflated and removed by peeling it off of the wall.

The several aligning rods 12 are deflated and, after being deflated, they will return to the condition noted in FIGURE 7. At this time the rods are rotated approximately 180° as shown in FIGURE 9 so that the flanges will lie within the cylindrical bores through the masonry unit and the substantially cylindrical bores through the mortar between masonry units. As the aligning rods in this position are substantially circular at their largest points and are positioned within holes of substantially the same diameter, they may be withdrawn upwardly and removed from the masonry wall. This is greatly preferred as it permits the re-use of these rods. Even though they might be constructed inexpensively, a large number would be utilized in erecting a building, and it is preferred to remove them for re-use. At this time the holes previously occupied by the aligning rods may be filled with mortar if desired, but this is not necessary.

While one section of the wall is cooling, such as shown in the right hand section of wall illustrated in FIGURE 1, the adjacent section of wall may be under construction, such as shown in the left hand section of FIGURE 1.

While additional wall sections might be built directly upon the previously built wall sections, it is preferred to first lay a base plate such as shown in the upper extreme right corner of FIGURE 1. This will provide a base for the aligning rods to rest upon. It will be understood, however, that the second section could be constructed by inserting the lower end of the aligning rods into the holes from which they were removed after the lower section of the wall had cured.

Reference is now made to FIGURES 14 through 21 and 23 through 30 wherein additional apparatus for use in practicing the methods of this invention are shown, and wherein a slightly modified and faster method of wall erection is illustrated.

It has been found that greater speed of wall erection is possible when a supporting and aligning board such as shown in the drawings is utilized. The aligning board may take any form in which a large number of masonry units will automatically be arranged in the desired interlocking pattern and ready to receive the aligning rods. Conveniently, a sheet of ¾ inch plywood 36, about 4 feet by 2 feet, will provide a base for the aligning board. While the board might be loaded while extending horizontally, it is preferred that it be held in about a 30° position during loading of the board. For this purpose, a support leg 37 is hinged to the upper end of the board as shown at 38. A suitable chain 39 secures the free end of leg 37 to the bottom of the board as shown at 41 to limit swinging movement of the leg. The board may be suitably reinforced by box section aluminum strips 42 and 43 extending vertically along the underside of the board 36.

The support member 36 of the board is provided with a plurality of ledges 44 which are suitably attached to the board and extend thereacross parallel to each other. Preferably, these ledges are provided by aluminum angles with one leg secured to the support member 36 and the other leg extending perpendicular thereto to provide a support for the masonry units between adjacent ledges. With the board extending vertically, the ledges 44 extend horizontally. To provide maximum support for the masonry units, the leg 44a of angle members 44 is preferably dimensioned to extend further out from the board than the several aligning rods 12 when the rods are in position in masonry units on the board. For this reason, the legs 44a of the ledges are notched at 45 as best shown in FIGURE 19 to permit the rods to extend through the masonry units.

In addition to providing for horizontal alignment by the ledges 44, it is desired to provide for alignment of the masonry units along the ledges, and this may be accomplished by having suitable pins 46 and 47 extend outwardly from the support member 36. These pins may be carried by either of the support member or ledges, it only being necessary that a pin of some nature provide an abutment in the space between adjacent ledges to engage the ends of the masonry units and properly orient them so that they will have the masonry units of adjacent courses in interlocking relationship. In FIGURE 18 it will be noted that two pins 47 are positioned approximately one-third of the way from each side of the supporting member 36. In the space between the next adjacent set of ledges three pins 46 are provided. Using standard individual brick of about 8 inches in length, it will be apparent that two brick will be positioned between the three pins 46 whereas three brick will be positioned by the pins 47. As the pins 47 are staggered relative to pins 46 and said pins respectively are in alternate courses of brick as defined by the board, it is apparent that the board illustrated will align brick in the common interlocking pattern. As a section of the wall is erected using the board of FIGURE 18, there will result at the free end of the wall an interlocking pattern in which the brick of the second course from the base will project out over brick of the first course. A second board identical to the one shown in FIGURE 18, except that the aligning pins 46 and 47 are interchanged, is then used to align and support the next section of the wall so that as the next section of the wall is moved into place it will position brick in the proper interlocking orientation to interlock with the masonry units erected using the board of FIGURE 18. As this second section is moved into place and interlocked with the previous section of the wall, an aligning rod is inserted through the interlocking masonry units and inflated to lock the two sections of wall together.

To assist in positioning the aligning board, a pair of latches is provided at the bottom of the board. Identical hinge members 48 are secured to the support member 36 on opposite sides thereof and at the bottom of the support member. Identical latch members 49 are hinged to hinge member 48. Referring specifically to FIGURE 14, it will be noted that the board is positioned with latch member 49 hooked into channel 81 which is imbedded in mortar in the base. This properly orients the aligning board relative to the channel so that when the board is tilted to a vertical position the lower ends of the aligning rods 12 will move into channel 81.

Referring to FIGURES 28 and 29, there is shown an aligning board which may be used for aligning successive sections of masonry units in interlocking relationship. The support member is again provided by a sheet of ¾ inch plywood indicated at 50. Again a plurality of ledges 52 extend parallel to each other and are mounted on the support member 50 in the manner previously explained. In the space between each pair of adjacent support ledges 52, the support member 50 is provided with three spaced slots. These slots extend parallel to the ledges 52. Slots 53a, 53b and 53c are arranged in every other space between ledges 52. In the other spaces between ledges 52 three spaced slots 53d, 53e and 53f are provided and overlap slots 53a, 53b and 53c. Bars 54 and 55 are arranged alternatively and extend parallel to ledges 52. As best shown in FIGURE 29, a bolt 56 extends through each of the slots such as 53a and threadingly engages bars 54 and 55. The bolts 56 extend a suitable distance through and beyond bars 54 and 55 to provide aligning pins for aligning masonry units. As the bolts are affixed to the bars and slide in the slots 53, 54 and 55, it is apparent that the position of the aligning pins may be shifted laterally of the support member 50. The slots beneath bars 54 and 55 should approximately just overlap each other so that as the pins are reciprocated in their slots from one extreme position to the other they will, in effect, exchange positions with the pins which align the adjacent courses of masonry units.

To provide for rapid shifting of the bars 54 and 55, they are preferably tied together by a tie member 57 so that all bars will shift simultaneously. With the exception of the differences just noted the board of FIGURE 28 is identical with the board of FIGURE 18.

In the use of this form of board two masonry units will be positioned between the three aligning pins 56 in the top course of masonry units. It will be noted that in the next to the top course there is room for the masonry units without any projecting beyond the support member 50, and this arrangement will provide the conventional interlocking pattern. When the tie member 57 is moved to the right or toward the support member 50, the aligning pins 56 will all shift to the right. At this time it will be noted that three masonry units may be positioned in the top course and all be supported within the confines of the support member 50. As this is the reverse relationship to that first explained, it is apparent that alternate sections of a wall may be aligned with the aligning board of FIGURE 28 and the need for a second aligning board has been eliminated.

FIGURES 24 and 25 illustrate the recommended form of bed joint grid member for masking the face of the wall. In cross-section this member is generally H-shaped and is formed of elastic material such as rubber or synthetic rubber. One leg 57 of the masking member is preferably longer than the other leg 58 of the H-shaped member. In the one leg 57 and opposite the cross-bar 59 of the H-shaped member there is provided a groove 61 which weakens the leg 57 at its juncture with the cross-bar 59 to permit the upper and lower sections of the leg 57 to be folded back and lie along side of the cross-bar 59 as shown in FIGURE 25. It will be noted that the leg 58 is dimensioned to just fit between two courses of masonry units. With the leg 57 folded back as shown in FIGURE 25, it will be appreciated that the rubber is distorted and tends to return to the condition shown in FIGURE 24 thus forming a slight seal with the masonry units. However, as the only pressure on the seal is that caused by mortar inside of the wall, it will be appreciated that the seal will permit air to escape from within the wall and thus avoid any air pockets being formed. As a practical matter, masonry units do not normally have smooth surfaces, and therefore the seal provided by the bed joint is imperfect and air can freely escape. The seal is however sufficient for the purpose of containing mortar and any slight leakage which occurs past the seal can quickly be stopped by pressing sand against the leak to absorb the water from the mortar and forming a blockage to further leaking.

As shown in FIGURE 26, the bed joint masking member is used in the spaces between horizontal course. A different masking member must be used for the vertical spaces as they are not in alignment. Such a seal is illustrated in FIGURE 23. This seal is substantially similar to the bed joint masking member except that, in effect, sections of the seal member are integrally joined together by a continuation of one of the legs of the seal member. The head joint masking member of FIGURE 23 is provided by a wide strip of material 62 having at spaced points thereon a T-shaped attachment 63. It may be considered that that portion of the wide strip 62 to which the T-shaped attachment 63 is connected provides a seal member, and the portion of the strip 62 intermediate seal members is a connecting section. When thus considered, it will be seen that the sealing portion of the head joint grid member is H-shaped in cross-section. One leg 64 of the H has a groove 65 in its face opposite the cross-bar 66 of the H to permit it to bend back in the manner and for the purposes explained in connection with the disclosure of the bed joint masking member. The distance between adjacent T-shaped sections 63 is equal to the height of the masonry units employed so that the interconnecting portion of strip 62 overlies the side of a masonry unit and the two T-shaped sections 63 fit into the head joints between adjacent masonry units above and below the unit over which the connecting section is positioned.

In FIGURE 21 there is shown a form of tie and reinforcing member which may be used with double wall construction. This tie includes a base member 67 provided by a rod of metal. To rod 67 there is fixed, as by welding, a plurality of members 68 having hook ends 69. As shown, the intersection between the rod 67 and each of members 68 engages an aligning rod in the wall. Likewise, the hook end 69 of these members 68 engages an aligning rod. By using a tie of this construction, the inner and outer section of the wall will be held against the pressure of mortar between the inner and outer section of the wall during the setting of the mortar.

As an aid in aligning the top of each section of masonry units, an elongate guide indicated generally at 71 may be employed. This guide is provided by four channel-shaped aluminum pieces 72, 73, 74 and 75. These channel-shaped members are held in fixed spaced relation by a plurality of threaded rods 76 and nuts 77 engaging each flange of each channel member. The nuts 77 hold the four channel members in a position to provide therebetween spaces 78 and 79 which correspond to the spacing between the channels 81 and 82 which are imbedded in the foundation and which define the distance between the aligning rods as the wall is erected. This relationship is best shown in FIGURE 15.

The time involved in erecting a wall in accordance with the present method will be dependent upon the number of masonry units and the number of aligning rods it is necessary to handle. With this in mind, a new masonry unit has been devised to cut down on the number of masonry units and aligning rods which must be used. This masonry unit is shown in FIGURE 22 and is comparable to three standard common brick united in a single structure. By way of example, the brick indicated generally at 83 may be 23⅝ inches long by 4 inches high and 4 inches wide. At points generally corresponding to those in which holes are provided in three common brick, the single brick 83 is provided with a plurality of holes 84. The holes 84 extend from the top to the bottom of the masonry unit in the conventional manner. In order to simulate common brick of approximately 8 inches in length, the masonry unit 83 is provided with vertically extending grooves 85 in each side wall at approximately one-third of the length of the masonry unit from each end. Thus the masonry unit 83 is apparently divided into three common lengths by the grooves 85. The grooves 85 are of sufficient depth to permit the head joint masking to be inserted into the groove and still leave space behind the head joint masking. Thus when mortar is poured between adjacent masonry units it will percolate down into these deep grooves 85 and when the head joint masking is removed a common mortar joint at grooves 85 will be simulated. To provide sufficient room the grooves should be at least approximately ⅞ of an inch in depth.

In using the aligning boards the aligning pins 56 will project into the grooves 85 and the masonry unit 83 will be properly aligned by the board. Referring to FIGURE 28, the masonry unit will be positioned in the top course to have its left end in abutment with the leftmost aligning pin. The other two aligning pins will extend into the grooves 85 of the masonry unit. In like manner, the masonry unit 83 will be placed in alignment by positioning its leftmost end against the leftmost pin 56 of the next to the top course. This will cause an overlap of about 4 inches of adjacent courses of masonry units. In using masonry unit 83, a single aligning rod may be inserted through one of the two centrally located holes 84. This will hold the masonry unit in the desired alignment until the aligning board is vertically positioned and another aligning rod may be run down through the end hole 84 and into the end hole 84 of a previously erected section of interlocking masonry units. When this second aligning rod is inflated, the section of masonry units being erected will have its alignment completed. Of course, when the next section of the wall is erected, the aligning rod tying the next section will pass through the other end hole 84 of masonry unit 83 with the result that each masonry unit will be supported upon three aligning rods during the completion of the wall. If desired, more aligning rods may be used, but with skilled labor and the brick of FIGURE 22 three rods will suffice.

When the end of a wall is reached, such as at a door jamb, the masonry units may be readily turned in the double wall to complete the jamb. In FIGURE 27 there is shown a door jamb provided by a double masonry unit wall with the masonry units set close together. As the jamb is reached, the wall sections erected using the board will terminate with their extremity provided by the ends of masonry units 86, 87, 88, 89, 90 and 91. Masonry units may be turned perpendicular to the wall and inserted between the courses provided by masonry units 86–87 and 88–89, such as masonry unit 92. In like manner, a masonry unit 93 is inserted between courses provided by masonry unit 88–89 and 90–91. Aligning rods are then inserted through the several masonry units 86–91 to hold the masonry units 92 and 93 in position and complete the wall.

Where a wall is provided having spaced inner and outer faces such as shown in FIGURE 16, the inner and outer wall is arranged so that the extreme end of the wall is provided by alternate masonry units of the inner and outer masonry units of the wall, such as masonry units 94 and 95 (FIGURE 30). Then masonry unit 96 may be turned with its length dimension transverse to the wall, as illustrated in FIGURE 30, to bridge the space from the outer edge of masonry unit 95 to the inner edge of masonry unit 94.

In the practice of the method utilizing the aligning board, a supporting foundation 97, preferably of concrete, is laid. Then the channel members 81 are carefully laid and bedded in mortar on top of the foundation. They will be laid to determine the direction of the wall and are carefully levelled as they provide the basic horizontal levelling of the wall. After the mortar 98 in which they are bedded has set, erection of the wall may begin. The aligning board is positioned as shown in FIGURE 14 with the hooks 49 in place hooked in channel 81. By way of example, common brick 99 having three vertical holes therethrough 101 (FIGURE 17) may be stacked on the board and held in the proper position by the coaction of the ledges 44 and the aligning pins 46 and 47. The aligning rods 12 are then inserted through the brick 99 as shown in FIGURE 14, properly oriented as previously explained, so that the flanges on the aligning rods all face the same direction, and the rods inflated. As previously explained, this gives a straight wall. Random orientation of the aligning rods may sometimes be desired to give the effect of a wavy wall. After the aligning rods are inflated, the board is tilted to a vertical position and the bottom ends of the aligning rods positioned in channel 81. After the wall section indicated at 99 in FIGURE 14 has been raised as shown, it is temporarily held in place while the wall section indicated generally at 101 is assembled and raised in the same manner. After the wall sections 99 and 101 have been raised, they may be tied together by the top tie member 71 as shown in FIGURES 15 and 16. The reinforcing ties shown in FIGURE 21 are then inserted in the wall as at 102, 103 and 104. At this time the plumb of the wall is checked and any adjustments necessary may be made by pushing on the wall. The wall may be temporarily held in plumb in any desired way. For instance, an auxiliary support such as a 2 x 4 is attached to the top of the wall and temporarily attached to a base such as a heavy piece of wood, or the like, to hold the wall in plumb. Meanwhile, other workmen are inserting the bed joint grid shown in FIGURES 24 and 25 in between horizontal courses of masonry units such as shown in FIGURE 26. After the horizontal bed joints have been stuffed with the grid, the vertical head joints are closed by applying the head joint grid member to the face of the wall. Where a double wall is erected as illustrated in FIGURE 14, both of the opposite sides of the wall will have the seal grid applied thereto as shown in FIGURE 16.

Additional sections of the wall may be erected to raise the wall to any desired length, such as between a corner and a jamb, or the like. In raising alternate sections of the wall, either two of the aligning boards of the type shown in FIGURE 18 are used, or the single board shown in FIGURE 28 may be used to alternate staggering of the courses. At the end of the wall a jamb may be constructed as shown in FIGURE 30.

After the entire length of the wall has been completed, the masking grid applied to the entire wall, and the wall checked for plumb, a very light mortar slurry is applied to the wall from the top as through the delivery nozzle 105 (FIGURE 16). As the mortar fills up in the wall air will constantly escape through the masking grid and no voids will be left in the wall. After the mortar is introduced into the wall some leakage may occur about the grids. By using sand to absorb moisture from the mortar a barrier will be formed and substantially little or no cleaning of the wall will be necessary after it has been completed to remove mortar.

If desired, the wall may be washed off with a hose immediately after the mortar is poured to wash away any concrete which leaks past the grid, thus eliminating the necessity for acidizing the surface of the wall after the mortar has set up. After the mortar 106 has set up sufficiently for the wall to be self-supporting, the head and bed joint grids, of course, may be removed and the upper tie member 71 lifted off of the wall. The aligning rods are then collapsed by exhausting the air therefrom and rotated 180°. The aligning rods are then lifted vertically out of the wall to permit their re-use. If desired, mortar may be introduced into the spaces from which the aligning rods were removed. After a section of wall is complete, another section of wall may be erected thereon to increase the height of the wall. A channel 81 is held in place on top of the wall section by nails bedded in the mortar and the upper section of wall erected in the manner explained.

Particularly in the case of practicing the method using an aligning board, the flanges on the rods 12 may be omitted and the friction grip between the rods and masonry units depended upon to support the masonry units. The flanges are preferred in all cases as they provide both support and continuing positive alignment of masonry units.

It is apparent that while common interlocking bond has been illustrated, the method and apparatus may be used with stack bond, or any other design of wall pattern.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:
1. The method of erecting a masonry wall comprising, laying a supporting foundation,
securing a level base plate to the foundation,
supporting a plurality of spaced apart laterally expandable aligning rods on said base plate,
said aligning rods having spaced apart flanges on one side thereof,
supporting masonry units having holes therethrough on said rods with the rods extending through at least a portion of said holes and the masonry units resting on said flanges,
laterally expanding the aligning rods,
masking at least one side of the wall,
filling the spaces between masonry units with mortar,
collapsing the aligning rods and rotating them to remove the flanges from between the masonry units,
withdrawing the aligning rods, and
removing the masking.

2. The method of erecting a masonry wall comprising, laying a supporting foundation,
securing a level base plate to the foundation,
supporting a plurality of spaced apart laterally expandable aligning rods on said base plate,
said aligning rods having spaced apart flanges on one side thereof,
supporting masonry units having holes therethrough on said rods with the rods extending through at least a portion of said holes and the masonry units resting on said flanges,
laterally expanding the aligning rods to align the masonry units,
masking at least one side of the wall,
filling the space between masonry units with mortar,
collapsing the aligning rods and withdrawing the aligning rods, and
removing the masking.

3. The method of erecting a masonry wall comprising, laying a supporting foundation,
securing a level base plate to the foundation,
supporting a plurality of spaced apart laterally expandable aligning rods on said base plate,
said aligning rods having spaced apart flanges on one side thereof,
supporting masonry units having holes therethrough on said rods with the rods extending through at least a portion of said holes and the masonry units resting on said flanges,
laterally expanding the aligning rods to align the masonry units,
masking at least one side of the wall with an expandable resilient grid work insertable into spaces between adjacent masonry units,
inflating said masking grid,
filling the space between masonry units with mortar,
collapsing the aligning rods and rotating them to remove the flanges from between masonry units,
withdrawing the aligning rods,
deflating the masking grid, and
removing the masking.

4. The method of erecting a masonry wall comprising, laying a supporting foundation,
securing a level base plate to the foundation,
supporting a plurality of spaced apart laterally expandable aligning rods on the center line of said base plate,
said aligning rods having spaced apart flanges on one side thereof all oriented in the same direction,
supporting masonry units having holes therethrough on said rods with the rods extending through at least a portion of said holes and the masonry units resting on said flanges,
laterally expanding the aligning rods to align the masonry units,
masking at least one side of the wall,
filling the space between masonry units with mortar,
collapsing the aligning rods and rotating them to remove the flanges from between masonry units,
withdrawing the aligning rods, and
removing the masking.

5. The method of erecting a masonry wall comprising, laying a supporting foundation,
securing a level base plate to the foundation,
supporting a plurality of spaced apart laterally expandable aligning rods on said base plate,
said aligning rods having a chamber extending lengthwise thereof to permit their lateral expansion by the application of fluid pressure and having spaced apart flanges on one side thereof,
supporting masonry units having holes therethrough on said rods with the rods extending through at least a portion of said holes and the masonry units resting on said flanges,
introducing fluid pressure into said aligning rods to expand the aligning rods and align the masonry units,
masking at least one side of the wall,
filling the space between masonry units with mortar,
evacuating fluid pressure from the aligning rods to collapse them,
rotating the aligning rods to remove the flanges from between masonry units,
withdrawing the aligning rods, and
removing the masking.

6. The method of erecting a masonry wall comprising, laying a supporting foundation,
securing a level base plate to the foundation,
supporting a plurality of spaced apart laterally expandable aligning rods on said base plate,
said aligning rods having a chamber extending lengthwise thereof to permit their lateral expansion by the application of fluid pressure and having spaced apart flanges on one side thereof,
supporting masonry units having holes therethrough on said rods with the rods extending through at least a portion of said holes and the masonry units resting on said flanges,
introducing fluid pressure into said aligning rods to expand the aligning rods and align the masonry units,
masking at least one side of the wall,
filling the space between masonry units with mortar,
vibrating the wall to insure even flow of mortar throughout the spaces between masonry units,
evacuating fluid pressure from the aligining rods to collapse them,
rotating the aligning rods to remove the flanges from between masonry units,
withdrawing the aligning rods, and
removing the masking.

7. The method of erecting a double thickness masonry wall comprising, laying a supporting foundation, securing a level base plate to the foundation, supporting a plurality of spaced apart laterally expandable aligning rods in two parallel rows along the base plate, said aligning rods having fluid chambers extending lengthwise therein and spaced apart flanges on one side thereof, supporting masonry units having holes therethrough on said rods with the rods extending through at least a portion of said holes and the masonry units resting on said flanges, introducing a pressure fluid into the aligning rods to laterally expand the rods and align the masonry units, masking the exterior sides of the wall with a grid-like expandable mask by inserting a portion of the grid masking into the space between masonry units and expanding the masking grid, filling the space between masonry units with mortar, collapsing the aligning rods and rotating them to remove the flanges from between masonry units, withdrawing the aligning rods, collapsing the masking grid, and removing the masking grid.

8. The method of claim 7 wherein ties are extended between selected aligning rods of the two parallel rows as the masonry units are positioned on the aligning rods to tie the two parallel layers of masonry units together.

9. The method of erecting a masonry wall comprising, laying a supporting foundation, arranging masonry units having holes therethrough in interlocking relationship and spaced from each other by the distance desired in the finished wall, inserting inflatable aligning rods through the holes in said masonry units, inflating said aligning rods to firmly engage the masonry units and fix them in said spaced relationship, positioning the masonry units on the foundation as a part of a wall, and filling the space between masonry units with mortar.

10. The method of erecting a masonry wall comprising, laying a supporting foundation, arranging masonry units having holes therethrough in interlocking relationship and spaced from each other by the distance desired in the finished wall, inserting inflatable aligning rods through the holes in said masonry units, inflating said aligning rods to firmly engage the masonry units and fix them in said spaced relationship, positioning the masonry units on the foundation as a part of a wall, masking at least one side of said masonry units, filling the space between masonry units with mortar, and removing said masking and collapsing and removing said aligning rods after the mortar has set sufficiently to permit the wall to become self-supporting.

11. The method of erecting a wall of masonry units of the type having holes therethrough with the use of inflatable aligning rods comprising, laying a supporting foundation, arranging the masonry units on the aligning rods with the units spaced apart along the rods a selected distance and in interlocking relationship with the rods extending through holes in the units, inflating the rods to firmly engage the masonry units and fix them in said interlocking relationship, and filling the space between masonry units with mortar while the masonry units are supported on the aligning rods in position on said foundation to form a portion of a wall.

12. The method of erecting a wall of masonry units of the type having holes therethrough with the use of inflatable aligning rods comprising, laying a supporting foundation, arranging the masonry units on the aligning rods with the units spaced apart along the rods a selected distance and in interlocking relationship with the rods extending through holes in the units, inflating the rods to firmly engage the masonry units and fix them in said interlocking relationship, masking at least one face of said masonry units, filling the space between masonry units with mortar while the masonry units are supported on the aligning rods in position on said foundation to form a portion of a wall, and removing said masking and deflating and removing said rods after the wall has become self-supporting.

13. The method of erecting a wall of masonry units of the type having holes therethrough with the use of inflatable aligning rods and a board having guide means thereon for supporting and aligning masonry units in spaced interlocking courses comprising, laying a supporting foundation, positioning said board in a position to support and align masonry units, arranging masonry units on said board in said guide means with the units in interlocking courses, inserting aligning rods through holes in said units, inflating the rods to firmly engage the masonry units and fix them in said interlocking courses, positioning the board over the foundation with the aligning rods supported by the foundation and extending vertically, removing the board from the units, masking at least one side of the units, filling the space between masonry units with mortar, and removing said masking.

14. The method of erecting a wall of masonry units of the type having holes therethrough with the use of inflatable aligning rods and a board having guide means thereon for supporting and aligning masonry units in spaced interlocking courses comprising, laying a supporting foundation, positioning said board in a position to support and align masonry units, arranging masonry units on said board in said guide means with the units in interlocking courses, inserting aligning rods through holes in said units, inflating the rods to firmly engage the masonry units and fix them in said interlocking courses, positioning the board over the foundation with the aligning rods supported by the foundation and extending vertically, removing the board from the units, masking at least one side of the units, filling the space between masonry units with mortar, and removing said masking and deflating and removing said aligning rods after said mortar has set sufficiently for the wall to be self-supporting.

15. The method of erecting a wall of masonry units of the type having holes therethrough with the use of inflatable aligning rods and a board having guide means thereon for supporting and aligning masonry units in spaced interlocking courses comprising, laying a supporting foundation, positioning said board in a position to support and align the masonry units, arranging a first group of masonry units on said board in said guide means with the units in interlocking courses, inserting aligning rods through holes in said units, inflating the rods to firmly engage the masonry units and fix them in said interlocking courses, positioning the board over the foundation with the aligning rods supported by the foundation and extending vertically, removing the board from said units,
repeating said steps with a second group of masonry units and positioning them closely adjacent and parallel to said first group of masonry units,
masking opposite faces of said first and second groups of masonry units,
pouring mortar into the top of the two groups of masonry units until the spaces between masonry units and said two groups of masonry are filled with mortar, and
deflating and removing said rods after said mortar has set sufficiently for said wall to be self-supporting.

16. An aligning rod for use in erecting masonry walls comprising,
a core of relatively strong material,
an annulus of resilient material surrounding said core,
spaced apart flanges formed on the resilient material on at least one side of the rod,
an expansion chamber in the resilient material extending lengthwise of the rod,
said rod being substantially circular when viewed in cross-section through one of said flanges with the resilient material in undistorted position, and
means on one end of said aligning rod for admitting fluid under pressure to said expansion chamber.

17. An aligning rod for use in erecting masonry walls comprising,
a centrally located metallic core,
an annulus of resilient material surrounding said core,
spaced apart flanges formed on the resilient material on one side of the rod,
an expansion chamber in the resilient material on the other side of the rod extending lengthwise of the rod,
said aligning rod being substantially circular when viewed in cross-section through one of said flanges when the resilient material is undistorted,
said aligning rod being substantially circular when viewed in cross-section between a pair of said flanges when the expansion chamber is filled with pressure fluid, and
means on one end of said aligning rod for admitting fluid under pressure to said expansion chamber.

18. An aligning rod for use in erecting masonry walls comprising,
a central core of metallic material,
an annulus of resilient material surrounding said core,
spaced apart flanges formed on the resilient material on one side of the rod,
an arcuate expansion chamber in the resilient material on the other side of the rod extending lengthwise of the rod,
said aligning rod being substantially circular when viewed in cross-section through one of said flanges when the resilient material is undistorted,
said rod being substantially circular when viewed in cross-section between a pair of said flanges when the expansion chamber is filled with pressure fluid, and
means on one end of the aligning rod for admitting fluid under pressure to said expansion chamber.

References Cited by the Examiner
UNITED STATES PATENTS

| | | | |
|---|---|---|---|
| 860,927 | 7/1907 | Mann | 52—747 |
| 929,045 | 7/1909 | Stewart | 269—40 |
| 1,280,730 | 10/1918 | Henry | 269—40 |
| 1,333,523 | 3/1920 | Williams | 52—295 |
| 1,566,903 | 12/1925 | Durst | 25—128 |
| 1,844,828 | 2/1932 | Willson | 52—314 |
| 2,141,397 | 12/1938 | Locke | 52—204 |
| 2,160,792 | 5/1939 | Cantwell | 52—314 |
| 2,174,394 | 9/1939 | Stockman | 52—747 |
| 2,428,374 | 10/1947 | Malthouse | 52—747 |
| 2,537,492 | 1/1951 | Tidland | 61—53.72 |
| 2,681,561 | 6/1954 | Rees | 52—247 |
| 2,708,016 | 5/1955 | Penton | 52—396 |
| 2,724,261 | 11/1955 | Rensaa | 52—295 |
| 2,781,554 | 2/1957 | Robinson | 25—1 |
| 2,917,801 | 12/1959 | Fitzgerald | 25—1 |
| 3,036,407 | 5/1962 | Dixon | 52—585 |
| 3,043,585 | 7/1962 | McCormic | 269—22 |

FRANK L. ABBOTT, *Primary Examiner.*

JACOB L. NACKENOFF, HENRY C. SUTHERLAND, *Examiners.*